No. 877,714. PATENTED JAN. 28, 1908.
T. W. HEERMANS.
COMBINED POWER TRANSMISSION AND AUTOMATIC BRAKING MECHANISM
FOR MOTOR DRIVEN VEHICLES.
APPLICATION FILED JAN. 22, 1907.
3 SHEETS—SHEET 1.
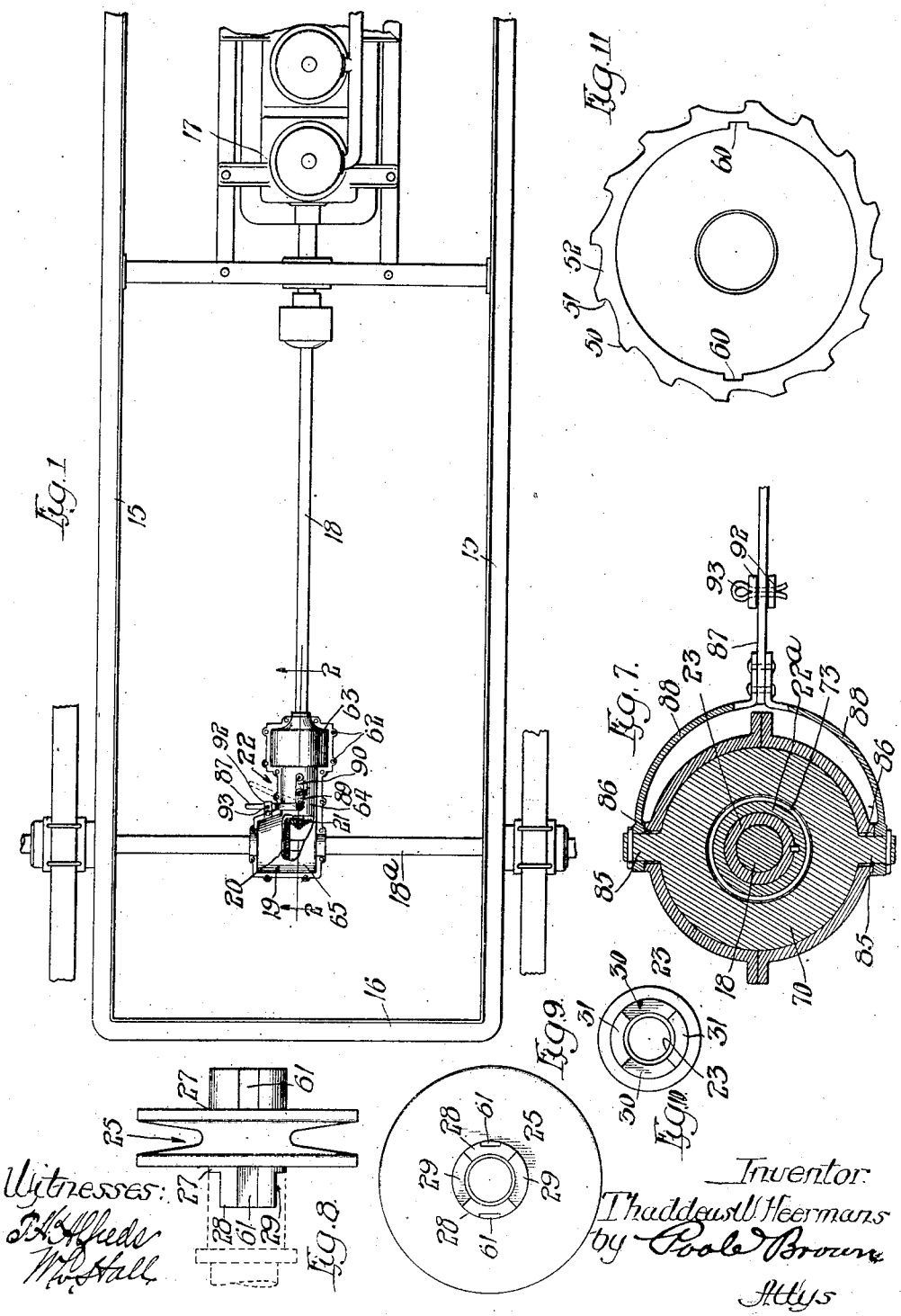

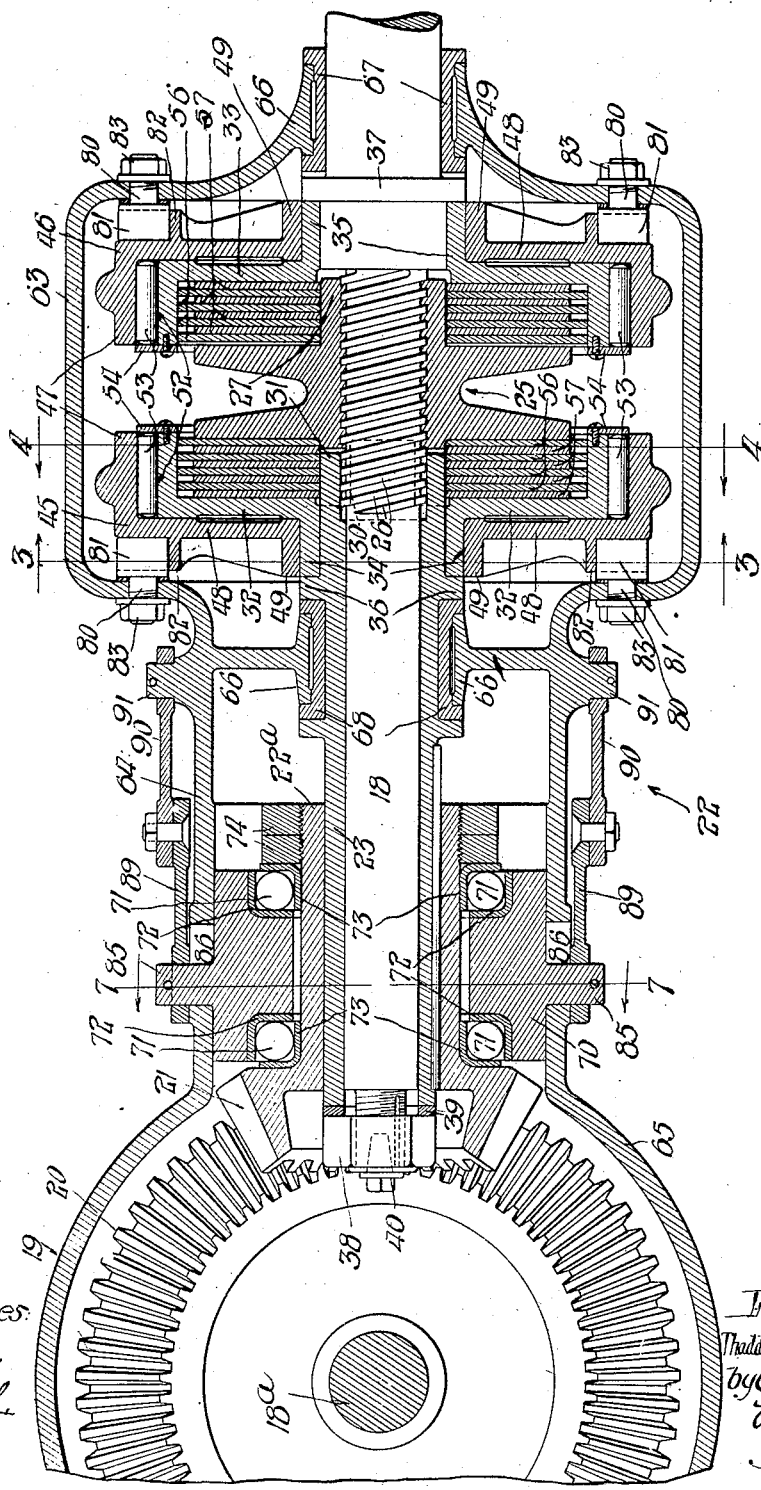

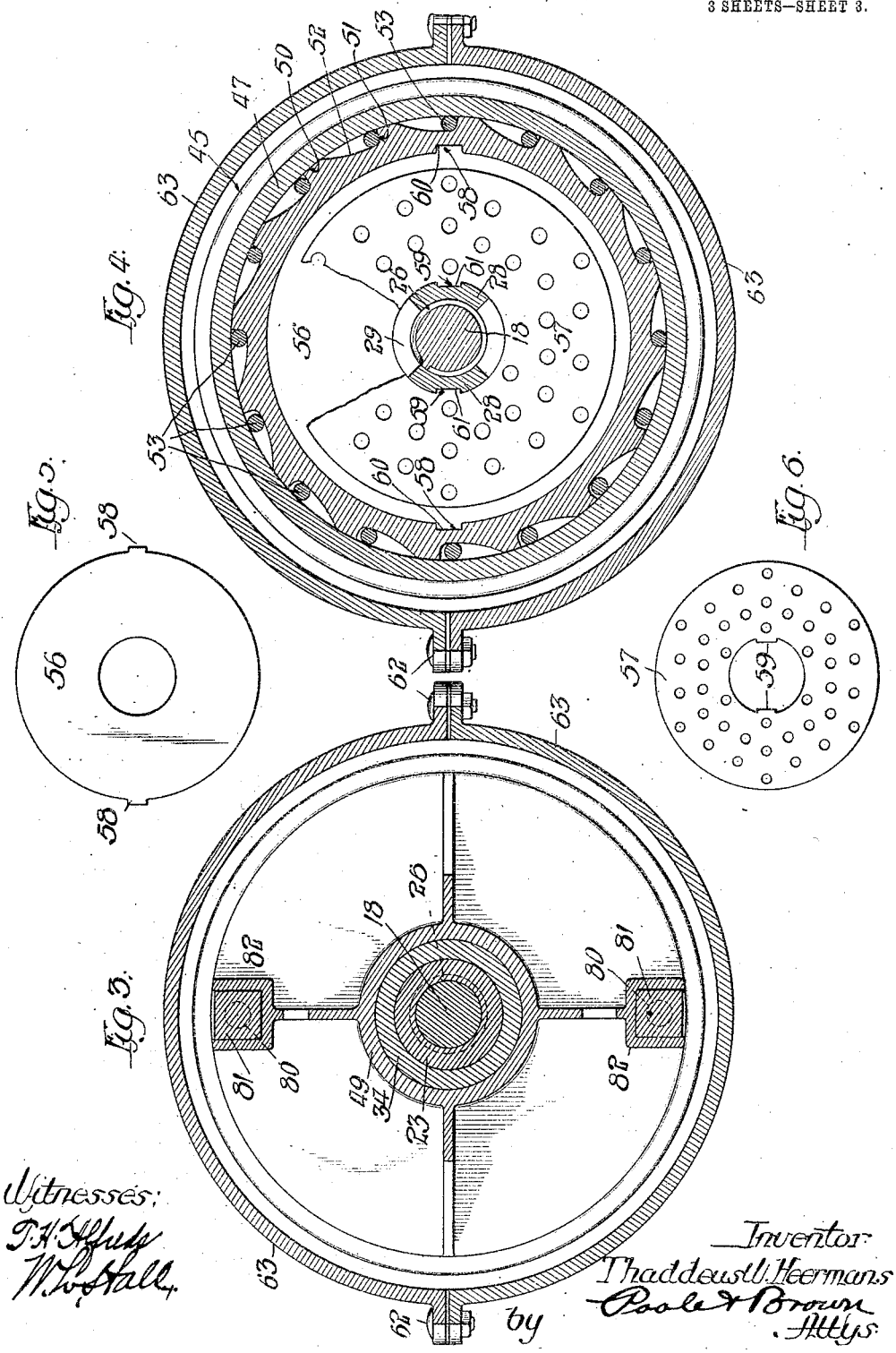

UNITED STATES PATENT OFFICE.

THADDEUS W. HEERMANS, OF EVANSTON, ILLINOIS.

COMBINED POWER-TRANSMISSION AND AUTOMATIC BRAKING MECHANISM FOR MOTOR-DRIVEN VEHICLES.

No. 877,714. Specification of Letters Patent. Patented Jan. 28, 1908.

Application filed January 22, 1907. Serial No. 353,519.

*To all whom it may concern:*

Be it known that I, THADDEUS W. HEERMANS, a citizen of the United States, and a resident of Evanston, in the county of Cook and State of Illinois, have invented certain new and useful Improvements in Combined Power-Transmission and Automatic Braking Mechanism for Motor-Driven Vehicles; and I do hereby declare that the following is a full, clear, and exact description thereof, reference being had to the accompanying drawings, and to the letters of reference marked thereon, which form a part of this specification.

This invention relates to improvements in motor-driven vehicles and refers more specifically to a combined automatic brake and power transmission mechanism for such vehicles.

The invention consists in the matters hereinafter set forth and more particularly pointed out in the appended claims.

In the drawings:—Figure 1 is a partial plan view of the chassis of a motor driven vehicle, showing my improvement applied thereto. Fig. 2 is a section, taken on line 2—2 of Fig. 1. Figs. 3 and 4 are cross-sections, taken respectively on lines 3—3 and 4—4 of Fig. 2. Figs. 5 and 6 illustrate friction rings constituting parts of the braking mechanism. Fig. 7 is a transverse section, taken on line 7—7 of Fig. 2. Fig. 8 is a side elevation of the shifting nut constituting part of the braking and power transmitting mechanism. Fig. 9 is an end view of said nut. Fig. 10 is an end view of the driving shaft sleeve that has interlocking connection with said nut. Fig. 11 is a side view of a locking ring constituting part of the braking mechanism.

As shown in the drawings, 15, 15 designate two side members, and 16 the rear member of the frame of the chassis of a motor driven vehicle.

17 designates the driving motor and 18 designates the rotative driving shaft operated by said motor.

18ª designates the rear axle of the vehicle.

19 designates a differential gear carried by the rear axle, said gear including a gear wheel 20 that meshes with a gear pinion 21 carried by the rear end of and rotated by the shaft 18. 22 designates, as a whole, my improved braking and power transmission apparatus, now to be described, it being shown in Fig. 1 as inclosed in a suitable casing which also extends over and incloses the differential gear. The said gear pinion 21, carried by the rear end of the shaft 18, is formed on a hub 22ª that is splined or otherwise secured to a sleeve 23 which is mounted on the rear end of the shaft and is adapted to have slight rotation relatively thereto. The splined connection of the bevel gear hub with the sleeve 23 permits said gear to be shifted longitudinally of the shaft 18 into and out of mesh with the gear wheel 20, for a purpose hereinafter to be described.

25 designates a nut which surrounds the driving shaft and is interiorly screw-threaded to engage exterior screw-threads 26 on said shaft. The said nut is adapted for interlocking engagement at one end with the adjacent end of the sleeve 23 carrying the pinion 21. For this purpose the hub 27 of said nut is provided at one end with angularly separated projections 28, 28 and intervening recesses 29, 29, and the sleeve 23 is provided with like recesses 30 adapted to receive the projections 28 of the nut and with projections 31 adapted to enter the recesses 29 of said nut. Located at the sides of said nut are two locking rings or members 32, 33. The former locking ring is provided with a hub 34 which surrounds and has bearing on the inner end of the pinion sleeve 23, while the latter ring is provided with a like hub 35 that surrounds and has bearing on the shaft 18. The outer end of the hub of the ring 32 bears against an inwardly facing shoulder formed on a flange 36 on the pinion sleeve 23, while the outer end of the hub 35 has like bearing against an inwardly facing shoulder formed on a flange 37 on the shaft 18. The said pinion 21 and its sleeve are locked on the shaft 18 by means of a nut 38 which has screw-threaded engagement with the outer reduced end of the shaft. A washer 39 is interposed between the nut and sleeve. The nut may be locked in place by a tapered screw-threaded stud 40 that has screw-threaded engagement with an axial socket in the slitted, reduced end of the shaft, as indicated in Fig. 2. The pinion sleeve 23 and the interlocked nut 25 are, therefore, confined between said nut on the one hand and the flange 37 on the other hand, said flange and nut constituting abutments which receive the thrust of said parts.

45, 46 designate stationary annular locking members exterior to and coöperating with the locking rings 32, 33. Said exterior locking members each consists of an annular flange 47 which surrounds its associated locking ring, a radial web 48 and a hub 49. The said hubs 49 have bearing on the hubs of the inner locking rings or members. The said exterior locking members are non-rotatively fixed in the mechanism, in a manner to be hereinafter described, whereby they are prevented from rotating on their axes. The inner locking rings or members 32, 33 are provided with peripheral projections or teeth 50 which extend towards the inner cylindric surfaces of the annular flanges 47 of said exterior locking members. Said teeth are each formed on one side to provide a concave recess 51 and on the other side an inclined cam or wedge-face 52, as shown best in Fig. 11. Within the chambers formed between the annular cylindric faces of said exterior locking members and the inner toothed peripheries of the inner locking rings are mounted a plurality of cylindric rollers 53. Said rollers are held in place by rings 54 fastened in any suitable manner to the inner faces of the interior locking rings 32 and 33 and overlapping the roller chambers. This arrangement of the parts permits each of the rings 32 and 33 to rotate freely in the direction toward which face the concave faces 51 of the teeth; but the rings are prevented from rotating in the opposite direction, inasmuch as the latter movement of the rings pinches the roller between the wedge faces 52 of said teeth and the inner cylindric faces of the flanges 47 of said exterior locking members. The inclined and the concave faces of the teeth of each interior locking ring are so disposed relatively to the like faces of the teeth of the other ring that one ring is adapted to be locked from rotation in one direction, while the other ring is likewise adapted to be locked from rotation in the other direction. Said locking rings are made hollow or recessed on their inner or adjacent sides to receive braking elements which are located between the bottom of said recesses and the nut 25 and coöperate with said parts in a manner hereinafter to be described to effect the braking action.

The braking elements herein shown comprise a plurality of friction rings 56, 57 arranged in two groups or sets, one group between each interior locking ring and nut 25. The rings 56 are provided with oppositely disposed peripheral projections 58 on their outer margins, while the rings 57 are provided with like projections 59 on their inner margins. The arrangement of the friction rings in the two groups are alike and said rings 56, 57 of each group are arranged in alternate order. The rings of one kind of each set are affixed to and rotate with the locking rings 32, 33, while the rings of the other kind are fixed to and rotate with the nut. As herein shown, said rings 56 are locked to and rotate with the locking rings, the peripheral projections 58 thereof entering recesses or sockets 60, 60 in the walls of the recesses of the locking rings. The friction rings 57, which rotate with the locking nut, are in a like manner locked to the nut, the projections 59 on the inner margins thereof entering notches 61 formed in the hub of the said nut. It will thus be seen that each of said rings has frictional engagement with another ring or the flat surface of the adjacent locking ring or nut. As shown, the rings of one of the alternate sets of rings are apertured in order to permit a lubricant to find its way to all parts of the bearing surfaces of the rings.

The main operative parts of the mechanism above described are inclosed within a casing made, as herein shown, of two halves horizontally divided and joined at their margins by bolts 62 extending through flanges on the meeting margins thereof. Said casing comprises three parts, to wit,—a chamber 63 inclosing the locking and friction devices, a cylindric or neck portion 64 inclosing the part of the shaft between said chamber and the differential gear, and a part 65 inclosing the differential gear. The said casing is formed to provide separated bearings for the shaft at suitably located points. At the ends of said chamber 63 are formed bearings 66, 66 which engage bearing bushings 67, 68 mounted on the shaft, each of which constitutes one member of each rotative bearing. The bearing for the end of the shaft adjacent to the differential gear comprises a ball bearing and is made as follows: 70 designates a ring which surrounds the hub 22ª of the shaft pinion 21. Said ring fits closely within the cylindric portion of the casing and is nonrotatively fixed within the casing by means hereinafter described. The sleeve is recessed at its ends to form annular ball chambers in which a series of antifriction balls 71 are located. The said annular recesses of the ring are faced with bearings rings 72 of angular cross-section, the radial member of each of which fits against the flat side of its associated recess, and the cylindric member of which fits against the cylindric inner surface of the recess. The hub of the pinion carries like shaped bearing or facing rings 73, the cylindric members of which engage the cylindric face of the hub and the radial members of which extend radially outwardly across the antifriction ball chambers, as clearly shown in Fig. 2. The said bearing ring and antifriction bearings are locked between an inwardly facing shoulder on the bevel pinion 21 and locking rings 74, 74, having screw-threaded engagement with the inner end of the hub of said pinion.

The means for nonrotatively fixing the exterior locking members 45, 46 in the inclosing casing are made as follows: 80, 80 designate studs which extend through and are rigidly connected with the end walls of the chamber 63 that incloses the braking mechanism proper. The said studs are provided at their inner ends with angular heads 81 which engage sockets 82, 82 formed on the outer faces of said exterior locking members. The lower sockets of said locking members open downwardly while the upper sockets open upwardly. The said studs are provided at their outer ends, outside the walls of the chamber 63, with nuts 83 by which the studs are clamped in place. The studs are fitted in the walls of the chamber before the casing is assembled about the mechanism, and are applied to inclose the mechanism after the latter has been assembled on the shaft 18. In assembling the casing, therefore, the lower member thereof is fitted to the parts from below, and the heads 81 of the studs enter the lower sockets through the lower open sides hereof. The upper member of the casing is likewise fitted in place from above and the heads of the upper studs enter their associated sockets through the upper open sides thereof.

The operation of the mechanism for driving and braking is as follows: Assuming that the shaft 18 rotates in a clock-wise direction to drive the vehicle forwardly through the intermeshing gears 20, 21, the first effect of the rotation of the shaft, turning within the nut 25, is to shift the nut against the group of friction rings associated with the locking ring 33 and thereby lock said nut to the shaft through the shearing action on the screw-threads of said parts. By reason of the interlocking connection of the sleeve 23 carrying the pinion with the nut, said pinion will be rotated in the same direction as the shaft to drive the vehicle forwardly. At this time, therefore, the nut and the associated set of friction rings between the same and the locking ring 33 constitute part of the driving or power transmission connections. It will also be observed that at this time the friction rings of the other group are loose and the shaft turns freely within the same and the locking ring associated therewith. Upon reversal of the direction of rotation of the shaft, as when the vehicle is reversed, the nut is shifted towards the set of friction rings associated with the locking ring 32, and when the shaft is thus reversely rotated by the motor, the friction rings associated with the locking ring 32 constitute part of the driving connections. It will be remembered that when either of said locking rings is thus locked to the shaft to rotate therewith, at a time when the motor drives the vehicle, such ring rotates in a direction towards which faces the cylindric recesses 51 of the teeth 52 of the inner locking ring, thereby permitting each ring to rotate in its proper direction freely. Should the load tend to drive or reverse the direction of the motor, the said shifting nut and the two groups of friction rings operate to arrest the vehicle and bring it to a stop in the following manner. In the event the pinion 21 and its sleeve and the nut 25 connected therewith tend to rotate relatively to the shaft in the same direction which the shaft rotates in driving the vehicle, (as, for instance, when the motor and its shaft 18 are slowed down or arrested, or when the load of the vehicle tends to drive the motor) the effect is to shift the nut 25, by reason of its screw-threaded engagement with the shaft, towards that group of friction rings and locking ring opposite to the group of friction rings which coöperated to lock the nut to the shaft when the vehicle was being driven by its motor through said shaft. The locking ring associated with the friction rings towards which the nut has just been shifted is now locked to the shaft through the agency of said latter friction rings. Inasmuch, however, as the direction of rotation of the parts at this time is the direction toward which face the inclined or wedge-shaped margins of the teeth 50 thereof, said locking ring is locked from rotation by the wedging action of the rollers 53 between said inclined margins of the teeth and the cylindric inner surface of the annular flange 47 of the associated exterior locking member. The vehicle is therefore brought to a state of rest or slowed down, depending upon whether or not the driving shaft ceases rotation or continues to rotate. It is obvious that the action described will occur whether the vehicle be running forwardly or backwardly. If, on the other hand, the load tends to reverse the direction of movement of the vehicle (as, for instance, when ascending a hill and the motor is stopped) the mechanism operates to arrest the motion of the vehicle rearwardly in the following manner. Such reversal of the pinion 21 and the sleeve 23 effects the shifting of the nut 25 toward the group of friction rings associated with the locking ring 33 and thereby frictionally locks said ring 33 to rotate with the nut. Inasmuch, however, as the disposition of the inclined or wedge surfaces of the teeth of said locking ring and rollers is active in this direction of rotation, said parts are arrested from rotation and the vehicle is stopped. Thus it will be seen that the two groups of sets of friction rings coöperate with the shifting nut 25 to impart a driving connection at the time the vehicle is being operated through the shaft 18.

In order to permit the vehicle to be moved on its wheels from place to place by other means than its own power, as for instance, when it is desired to push the vehicle from place to place by hand, means are provided for disconnecting the shaft 18 from the differential gear of the gear axle. In the present instance this is effected by moving the driving pinion 21 forwardly out of mesh with the differential gear wheel 20. A convenient means for effecting this result is herein shown and is made as follows: The bearing sleeve 70, mounted in the neck portion 64 of the inclosing casing, is provided with oppositely extending lugs 85, 85, which extend through horizontal slots 86, 86, in the opposite sides of the casing (Figs. 2 and 7). This connection of the bearing sleeve 70 with the casing holds said sleeve from rotating in the casing. Said lugs constitute pivots for a power connecting and disconnecting lever 87 provided with two arms 88, 88, extending one on each side of the casing and provided with pivot apertures in which said lugs have bearing. Fixed to or made integral with said lever arms are shorter arms 89 which extend forwardly from said pivot lugs. Loosely or pivotally connected with the inner ends of said shorter arms are links 90, 90 which are in turn loosely connected with lugs 91, 91, integral with and extending laterally from said casing, as most clearly shown in Figs. 1 and 2. It will thus be evident that when the lever 87 is swung forwardly into the dotted line position indicated in Fig. 1, the sleeve 70 and the pinion 21, movable therewith, will be shifted forwardly so as to disengage said pinion from the gear wheel 20, and thereby disconnect the rear axle of the vehicle from the motor. Any suitable means may be employed for operating the said lever and locking it in place. The lever is herein shown as designed to be locked to a lug or bracket 92 extending forwardly from the casing at one side of the intermediate or neck portion thereof by a pin 93 extending through said lug and lever. The connections for actuating said bevel pinion from the lever constitutes connection which serves to reliably hold the pinion engaged with the gear wheel 20 without throwing any considerable stress on the operating lever or its locking devices.

Such parts of the motor driven vehicle that are not directly connected with the invention herein disclosed have been omitted, for the sake of clearness of illustration of the invention, it being understood that the present invention may be adapted to variously designed motor driven vehicle mechanisms. It may be furthermore observed that the details of the invention will be varied to adapt the invention to different types of vehicles.

I claim as my invention:—

1. In a motor driven vehicle, the combination with the motor driven shaft, the driven axle and power transmission connections between said motor shaft and driven axle, of an automatic brake mechanism coöperating with said power transmission connections, means whereby the brake mechanism is automatically operated to arrest the vehicle upon tendency of the load to drive the vehicle, and means for disconnecting the driven axle from said brake mechanism at a point between the axle and brake mechanism.

2. In a motor driven vehicle, the combination with the motor driven shaft and the driven axle thereof, of a sleeve mounted on said shaft and capable of rotation thereon, a pinion non-rotatively fixed to the sleeve and operatively connected with the driven axle, means operatively connected with the end of said sleeve and designed to constitute part of the power transmitting connection when the vehicle is driven by the motor, and an automatic brake mechanism coöperating with said connecting means for arresting the vehicle when the load, acting through said sleeve, tends to drive the vehicle.

3. In a motor driven vehicle, the combination with the motor driven shaft and the driven axle thereof, of a sleeve mounted on said shaft and capable of rotation thereon, a pinion non-rotatively fixed to the sleeve and operatively connected with the driven axle, a nut having screw-threaded engagement with the shaft and interlocked with said sleeve and constituting part of the power transmission mechanism when the vehicle is driven by the motor, and an automatic brake mechanism comprising stationary braking devices and braking devices movable with said nut, and means coöperating with said braking devices, upon tendency of the load to drive said vehicle, to arrest said vehicle.

4. In a motor driven vehicle, the combination with the motor driven shaft and the driven axle thereof, of a sleeve mounted on said shaft and capable of rotation thereon, a pinion meshing with a gear carried by the driven axle, said pinion being non-rotatively fixed to said sleeve and designed to slide endwise thereon, means operatively connected with said sleeve and designed to constitute part of the power transmission connection when the vehicle is driven by the motor, an automatic brake mechanism coöperating with said connecting means for arresting the vehicle, when the load, acting through said sleeve, tends to drive the vehicle, and means for shifting said pinion endwise of the sleeve into and out of engagement with the gear on the driven axle.

5. In a motor driven vehicle, the combination with the motor driven shaft and the driven axle geared to said shaft, of an automatic braking mechanism, means operating said braking mechanism, when the load tends to drive the vehicle in either direction, to automatically bring the vehicle to a stop, and means for operatively disconnecting the driven axle from the brake mechanism.

6. In a motor driven vehicle, the combination with the motor shaft capable of rotation in both directions and the driven axle of the vehicle, of a combined power transmission and automatic braking mechanism for operatively connecting said motor shaft and driven axle, including means for transmitting power to operate the driven axle in both directions, means operating, upon tendency of the load to drive the vehicle in either direction to automatically arrest the vehicle, and means for operatively disconnecting the driven axle from the brake mechanism.

In testimony, that I claim the foregoing as my invention I affix my signature in the presence of two witnesses, this 12th day of January, A. D. 1907.

THADDEUS W. HEERMANS

Witnesses:
W. L. HALL,
T. H. ALFREDS.